United States Patent [19]
Bak et al.

[11] Patent Number: 5,999,732
[45] Date of Patent: Dec. 7, 1999

[54] TECHNIQUES FOR REDUCING THE COST OF DYNAMIC CLASS INITIALIZATION CHECKS IN COMPILED CODE

[75] Inventors: Lars Bak, Palo Alto; Srdjan Mitrovic, Redwood Shores, both of Calif.

[73] Assignee: Sun Microsystems, Inc., Palo Alto, Calif.

[21] Appl. No.: 09/046,401

[22] Filed: Mar. 23, 1998

[51] Int. Cl.⁶ ........................................................ G06F 9/45
[52] U.S. Cl. ............................................. 395/705; 395/709
[58] Field of Search ...................................... 395/705, 709

[56] References Cited

U.S. PATENT DOCUMENTS

| | | | |
|---|---|---|---|
| 5,526,499 | 6/1996 | Bernstein et al. | 395/700 |
| 5,579,520 | 11/1996 | Bennett | 395/704 |
| 5,586,328 | 12/1996 | Caron et al. | 395/700 |
| 5,613,120 | 3/1997 | Palay et all. | 395/700 |
| 5,659,751 | 8/1997 | Heninger | 395/712 |
| 5,692,047 | 11/1997 | McManis | 395/704 |

OTHER PUBLICATIONS

Lindholm, T.; Yellin, F. The Java Virtual Machine Specification. Reading, MA: Addison–Wesley Publishing Company. Chapter 2, Sep. 1996.

Gosling, J.; Joy, B; Steele, G. The Java Language Specification. Reading, MA: Addison–Wesley Publishing Company. Chapter 12, Sep. 1996.

Gosling, J; McGilton H. 'The Java Language Environment: A White Paper'. Chapters 1 and 5, Mountain View, CA: Sun Microsystems Inc. [online][retrieved on 1999-05-04]. Retrieved from the Internet: <http://java.sun.com/docs/white/index.html>, May 1996.

Kramer, D. 'The Java Platform: A White Paper'. Mountain View CA: Sun Microsystems Inc. [online][retrieved on 1999-05-04]. Retrived from the Internet: <http://java.sun.com/docs/white/index.html>, May 1996.

Cierniak, M; Wei L. 'Briki: an Optimizing Java Compiler' pp. 179–184 (abstract) IEEE proceedings of Compcon 1997 [online] IEEE/IEEE Electronic Library [retrieved on 1999-06-18] Accession No. 5552903, Feb. 1997.

Cramer, T.; Friedman, R.; Miller, T.; Seberger, D.; Wilson, R.; Wolczko, M. 'Compiling Java just in time' vol. 17, No. 5, pp. 36–43 (abstract) IEEE Micro [online] IEEE/IEEE Electronic Library [retrieved on 1999-06-18] Accession No. 5603819, May 1997.

Hsieh, C.–H.A.; Conte, M.T.; Johnson, T.L.; Gyllenhaal, J.C.; Hwu, W.–M.W. 'Compilers for improved Java performance' vol. 30, No. 6, pp. 67–75 (abstract) Computer [online] IEEE/IEEE Library [retrieved on 1999-06-18] Accession No. 5604189, Aug. 1997.

Comar, C.; Dismukes, G.; Gasperoni, F. 'Targeting GNAT to the Java virtual machine' pp. 149–161 (abstract) Proceedings of the conference on TRI–Ada '97 [online] New York, NY: Association for Computing Inc.[retrieved on 1999-06-16], May 1997.

Sun Microsystems Inc. 'Java On Solaris 2.6: A White Paper '. Mountain View, CA: Sun Microsystems Inc. [online] [retrieved on 1999-05-04]. Retrived from the Internet: <http://java.sun.com/docs/white/index.html>, Sep. 1997.

*Primary Examiner*—Tariq R. Hafiz
*Assistant Examiner*—Kelvin E. Booker
*Attorney, Agent, or Firm*—Beyer & Weaver, LLP

[57] ABSTRACT

Techniques for reducing the cost of dynamic class loading and initialization checks in compiled code are provided. Virtual machine instructions are compiled into one or more native machine instructions even if required runtime execution information is unavailable at the time of compilation. The native machine instructions include placeholder data where the required runtime execution information should be. The native machine instructions are overwritten with a native machine instruction that transfers control to a section of code or stub that, at runtime execution, replaces the placeholder data with the required runtime execution information and execution continues.

39 Claims, 10 Drawing Sheets

NATIVE INSTRUCTION$_1$
NATIVE INSTRUCTION$_2$
NATIVE INSTRUCTION$_3$
NATIVE INSTRUCTION$_4$
NATIVE INSTRUCTION$_5$
NATIVE INSTRUCTION$_6$
NATIVE INSTRUCTION$_7$
NATIVE INSTRUCTION$_8$
NATIVE INSTRUCTION$_9$
NATIVE INSTRUCTION$_{10}$
NATIVE INSTRUCTION$_{11}$
NATIVE INSTRUCTION$_{12}$
NATIVE INSTRUCTION$_{13}$
NATIVE INSTRUCTION$_{14}$

TECHNIQUES FOR REDUCING THE COST OF DYNAMIC CLASS INITIALIZATION CHECKS IN COMPILED CODE

BACKGROUND OF THE INVENTION

The present invention relates to compiling software. More specifically, the invention relates to techniques for reducing the cost of dynamic (i.e., during runtime) class loading and initialization checks in compiled code.

The Java™ programming language is an object-oriented high level programming language developed by Sun Microsystems and designed to be portable enough to be executed on a wide range of computers ranging from small devices (e.g., pagers, cell phones and smart cards) up to supercomputers. Computer programs written in Java (and other languages) may be compiled into virtual machine instructions for execution by a Java virtual machine. In general the Java virtual machine is an interpreter that decodes and executes the virtual machine instructions.

The virtual machine instructions for the Java virtual machine are bytecodes, meaning they include one or more bytes. The bytecodes are stored in a particular file format called a "class file" that includes bytecodes for methods of a class. In addition to the bytecodes for methods of a class, the class file includes a symbol table as well as other ancillary information.

A computer program embodied as Java bytecodes in one or more class files is platform independent. The computer program may be executed, unmodified, on any computer that is able to run an implementation of the Java virtual machine. The Java virtual machine is a software emulator of a "generic" computer that is a major factor in allowing computer programs for the Java virtual machine to be platform independent.

The Java virtual machine may be implemented as a software interpreter. Conventional interpreters decode and execute the virtual machine instructions of an interpreted program one instruction at a time during execution, which is in contrast to compilers that decode source code into native machine instructions prior to execution so that decoding is not performed during execution. The Java virtual machine may include both an interpreter and compiler for runtime compilation. Typically, the Java virtual machine will be written in a programming language other than the Java programming language (e.g., the C++ programming language).

At runtime compilation, a Java method may access (for either reading or writing) field of a class that has not been loaded. A Java virtual machine that is compiling the virtual machine instructions into native machine instructions at runtime to increase runtime performance may not have all the information available at the time of compilation. For example, if a class is not loaded then it is difficult, if not impossible, to determine the offset for an instance variable within an instance of the class.

One solution to the problem of unavailable runtime execution information is to generate native machine instructions that check to see if a class is loaded and initialized before fields of classes are accessed. In practice, this solution may do much more harm than good. The runtime checks may degrade the performance of the system much more than the compilation increases the performance.

Another solution to the problem of unavailable runtime execution information would be to load, and possibly initialize, any classes to which runtime execution information is required to compile the virtual machine instructions. Although this may seem like a good solution, it may unnecessarily slow down the system if at runtime execution it is not necessary to load the class. For example, if a statement that modifies a field of an instance of class A is only executed if X=0, then class A may be lazily loaded when X=0 (assuming class A will not be loaded for other reasons). Additionally, it is semantically incorrect to unnecessarily initialize a class because the Java runtime environment is designed to dynamically load classes at runtime only when they are needed.

SUMMARY OF THE INVENTION

In general, embodiments of the present invention provide innovative techniques for reducing the cost of dynamic class loading and initialization checks in compiled code. Virtual machine instructions are compiled into one or more native machine instructions even if required runtime execution information (e.g., offset to fields) is unavailable at the time of compilation. The native machine instructions may have placeholder data (e.g., dummy values) where the required runtime execution information should be. All or a portion of the native machine instructions may be overwritten with a native machine instruction that transfers control to a section of code or stub that, at runtime execution, replaces the placeholder data with the required runtime execution information.

Accordingly, the first time the native machine instructions are executed, the class may be loaded and initialized if necessary. However, since the required runtime execution information will be patched into the native machine instructions the first time they are executed, subsequent executions of the native machine instructions will not incur the cost of a class loading and initialization check. The invention provides the runtime performance of pre-runtime compilation. Additionally, the semantics of the system may be retained by initializing classes only at the proper time. Several embodiments of the invention are described below.

In one embodiment, a computer-implemented method for compiling instructions includes receiving an instruction for runtime compilation that requires runtime execution information. The instruction is compiled into one or more native machine instructions at a first location with the native machine instructions including placeholder data for the required runtime execution information. The initial portion of the native machine instructions at the first location are overwritten with a native machine instruction that transfers control to a section of native machine instructions that, at runtime, will replace the placeholder data with the required runtime execution information. In preferred embodiments, the instruction to be compiled is a Java virtual machine instruction.

In another embodiment, a computer-implemented method for compiling instructions includes receiving an instruction for runtime compilation that requires runtime execution information. The instruction is compiled into one or more native machine instructions at a first location with the native machine instructions including placeholder data for the required runtime execution information. At least a portion of the native machine instructions is copied to a second location. A section of native machine instructions is generated that, at runtime, replaces the placeholder data in the native machine instructions at the second location with the required runtime execution information, copies the native machine instructions with the required runtime execution information at the second location to the first location, and transfers control to the native machine instructions with the required runtime execution information at the first location. The initial portion of the native machine instructions at the first location are overwritten with a native machine instruction that transfers control to the section of native machine instructions.

In another embodiment, a computer-implemented method for compiling instructions includes receiving an instruction for runtime compilation that requires runtime execution information. The instruction is compiled into one or more native machine instructions at a first location with the native machine instructions including placeholder data for the required runtime execution information. At least a portion of the native machine instructions is copied to a second location. A section of native machine instructions is generated that, at runtime, copies the native machine instructions at the second location to the first location, replaces the placeholder data in the native machine instructions at the first location with the required runtime execution information, and transfers control to the native machine instructions with the required runtime execution information at the first location. The initial portion of the native machine instructions at the first location are overwritten with a native machine instruction that transfers control to the section of native machine instructions.

Other features and advantages of the invention will become readily apparent upon review of the following detailed description in association with the accompanying drawings.

DETAILED DESCRIPTION OF PREFERRED EMBODIMENTS

Definitions

Machine instruction (or instruction)—An instruction that directs a computing device to perform an operation specified by an operation code (OP code) and optionally one or more operands.

Virtual machine instruction—An instruction for a software emulated microprocessor or computer architecture (also called virtual code).

Native machine instruction—An instruction that is designed for a specific microprocessor or computer architecture (also called native code).

Method—A software routine (also called a function, subroutine, procedure, and member function).

Field—A variable of a class type including static variables and instance variables.

Instance variable—A variable of an instance of a class that exists once per instance.

Static variable—A variable of a class that exists once per class.

Runtime compilation—Compilation of code that is performed at runtime.

Runtime execution—Execution of code that is performed at runtime.

Detailed Description

In the description that follows, the present invention will be described in reference to preferred embodiments that reduce the cost of dynamic class loading and initialization checks for compiled Java virtual machine instructions. In particular, examples will be described that show the actual native machine instructions that may be generated for an IBM personal computer or compatible in order to perform runtime class loading and initialization checks for a compiled Java virtual machine instruction. However, the invention is not limited to any particular language, computer architecture, or specific implementation. Therefore, the description of the embodiments that follow is for purposes of illustration and not limitation.

Figure 1:
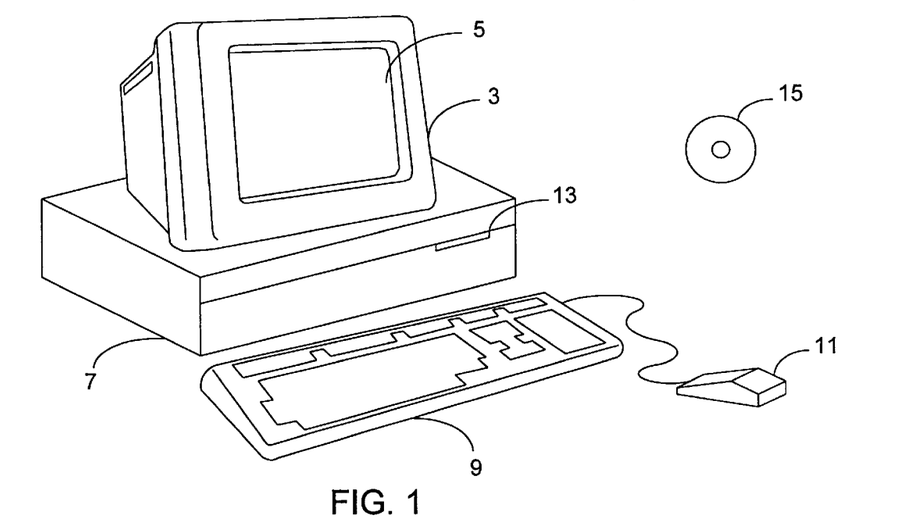
FIG. 1 illustrates an example of a computer system that may be utilized to execute the software of an embodiment of the invention.

FIG. 1 illustrates an example of a computer system that may be used to execute the software of an embodiment of the invention. FIG. 1 shows a computer system 1 that includes a display 3, screen 5, cabinet 7, keyboard 9, and mouse 11. Mouse 11 may have one or more buttons for interacting with a graphical user interface. Cabinet 7 houses a CD-ROM drive 13, system memory and a hard drive (see FIG. 2) which may be utilized to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 2:
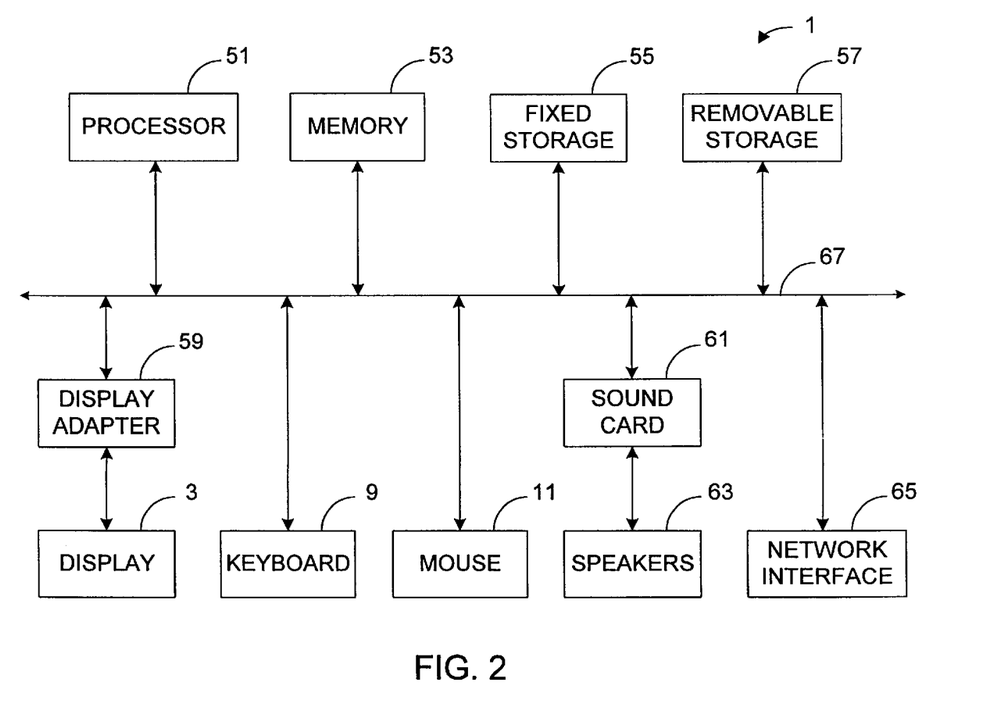
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems may also be utilized.

Figure 3:
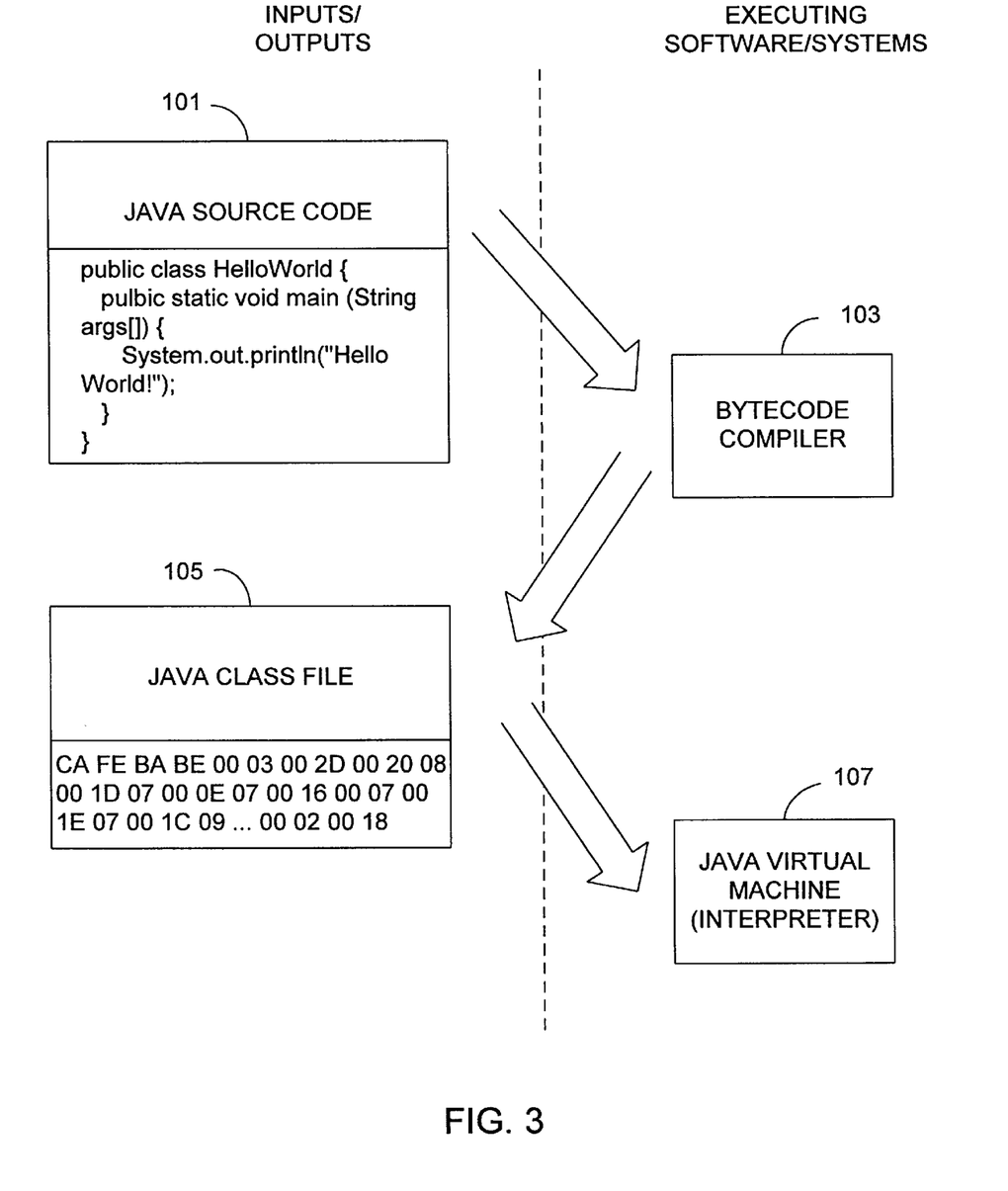
FIG. 3 shows how a Java source code program is executed.

Typically, computer programs written in the Java programming language are compiled into bytecodes or Java virtual machine instructions that are then executed by a Java virtual machine. The bytecodes are stored in class files that are input into the Java virtual machine for interpretation. FIG. 3 shows a progression of a simple piece of Java source code through execution by an interpreter, the Java virtual machine.

Java source code 101 includes the classic Hello World program written in Java. The source code is then input into a bytecode compiler 103 that compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 105 that includes the bytecodes for the Java program.

The Java class file is input into a Java virtual machine 107. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture that may not exist in hardware).

Java classes (and interfaces) are dynamically loaded, linked and initialized. Loading is the process of the system finding the binary form of the class (e.g., the class file) and constructing from the binary form a Class object to represent the class. The Class class is a class for storing or representing the structures of classes. Linking is the process of taking a binary form of the class and combining it into the runtime state of the system so that it may be executed. Initialization of a class includes executing the class' static initializers and initializers for static fields declared in the class.

Each Java class has a constant pool associated with it. The constant pool is stored in the Java class file and serves a function similar to symbol tables. Typically, each entry in the constant pool is indexed by a number starting with 1 and going up to the number of entries in the constant pool. A method for a class accesses entries in the constant pool by the index and a method for one class may not access a constant pool for another class.

In addition to the constant pool storing literal constants, the constant pool stores classes, methods, fields, and interfaces symbolically. By storing these entries symbolically it is meant that the name identifying the entry is stored, not the physical address. In other words, if a class A has a field F, both the names of A and F (along with a type signature for F) may be stored in the constant pool. By storing names and not address, the Java runtime system resolves the symbolic reference into a physical address dynamically at runtime.

Figure 4:
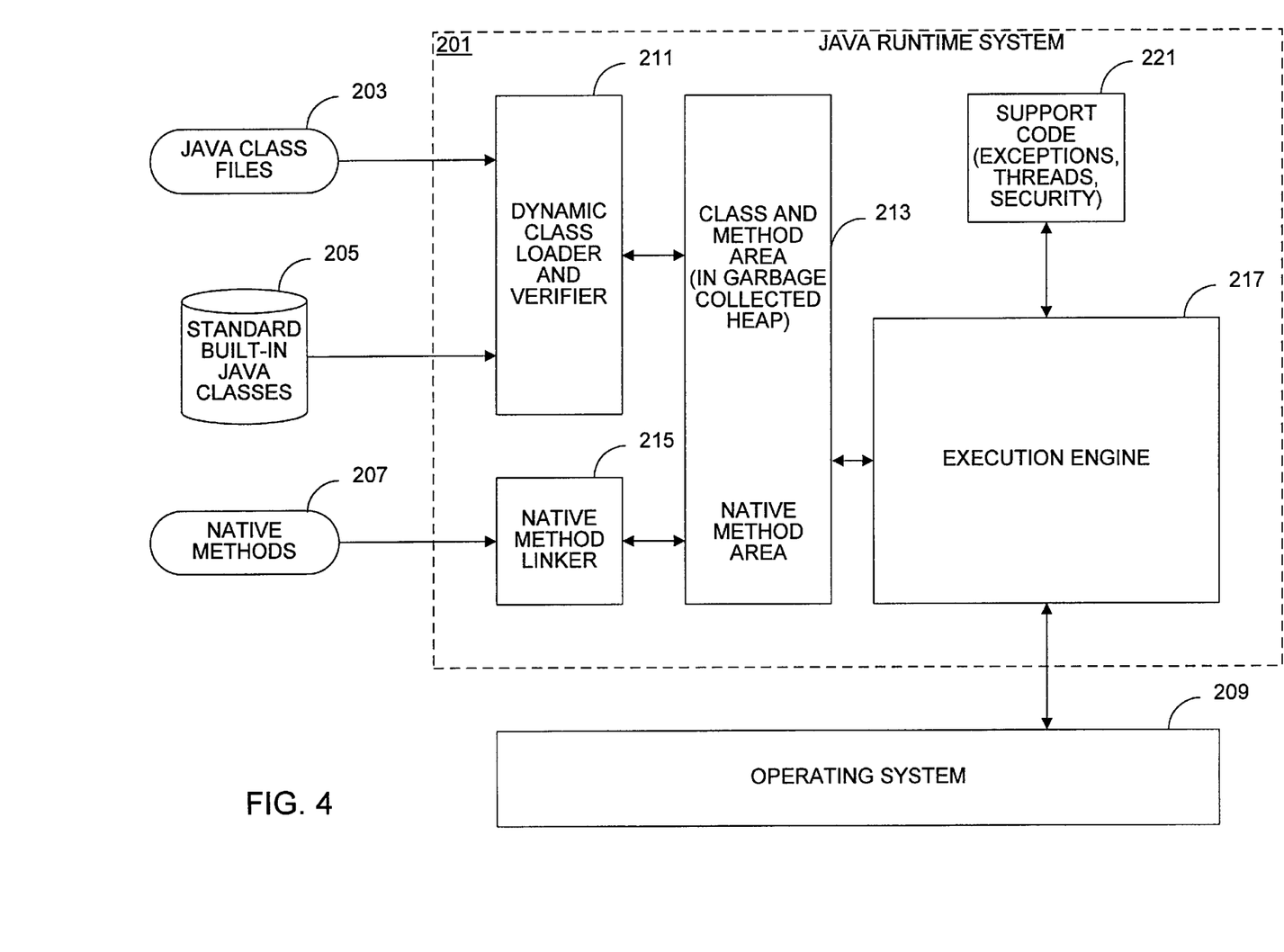
FIG. 4 shows the components of an implementation of a Java runtime system.

FIG. 4 shows the components of an implementation of a Java runtime system. Implementations of the Java virtual machine are known as Java runtime systems. A Java runtime system 201 may receive input of Java class files 203, standard built-in Java classes 205 and native methods 207 in order to execute a Java program. The standard built-in Java classes may be classes for objects such as threads, strings and the like. The native methods may be written in programming languages other than the Java programming language. The native methods are typically stored in dynamic link libraries (DLLs) or shared libraries.

The Java runtime system may also interface with an operating system 209. For example, input/output functions may be handled by the operating system, including providing the Java runtime system with interfaces to Java class files 203, standard built-in Java classes 205 and native methods 207.

A dynamic class loader and verifier 211 loads Java class files 203 and standard built-in Java classes 205 via operating system 209 into a memory 213. Additionally, the dynamic class loader and verifier may verify the correctness of the bytecodes in the Java class files, reporting any errors that are detected.

A native method linker 215 links in native methods 207 via operating system 209 into the Java runtime system and stores the native methods in memory 213. As shown, memory 213 may include a class and method area for the Java classes and a native method area for native methods. The class and method area in memory 213 may be stored in a garbage-collected heap. As new objects are created, they are stored in the garbage-collected heap. The Java runtime system, not the application, is responsible for reclaiming memory in the garbage-collected heap when space is no longer being utilized.

At the heart of the Java runtime system shown in FIG. 4 is an execution engine 217. The execution engine carries out the instructions stored in memory 213 and may be implemented in software, hardware or a combination of the two. The execution engine supports object-oriented applications and conceptually, there are multiple execution engines running concurrently, one for each Java thread. Execution engine 217 may also utilize support code 221. The support code may provide functionality relating to exceptions, threads, security, and the like.

Execution engine 217 typically includes both an interpreter and a compiler. The execution engine may compile methods or portions thereof to increase the performance of the system. Therefore, "runtime" may include both compilation and execution. Runtime compilation is the time frame where Java bytecodes may be compiled and runtime execution is the time frame where Java bytecodes (whether compiled or not) are executed (e.g., decisions in the Java bytecodes are calculated and performed). There may be repeated shifts from runtime compilation and runtime execution within each thread and such shifts may be independent among threads.

Figure 5:
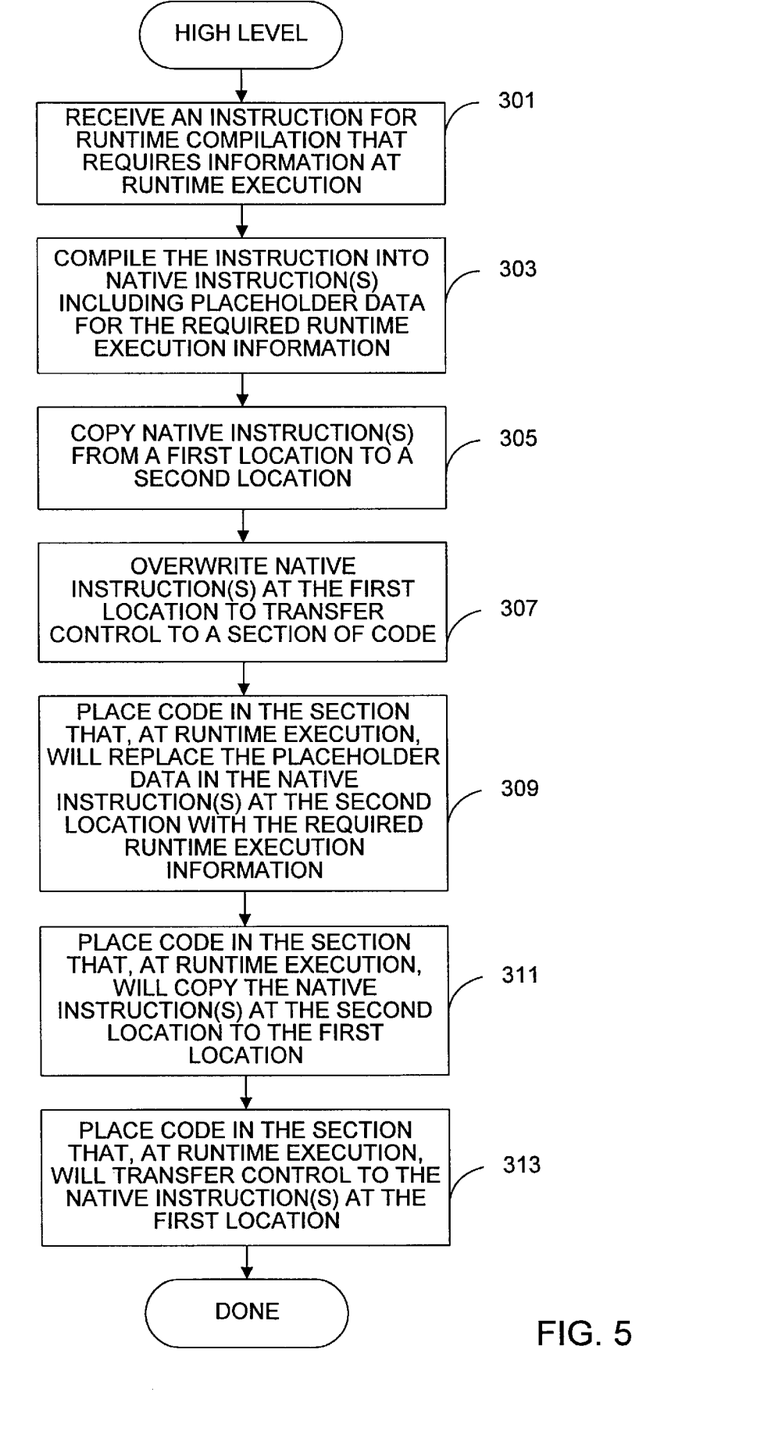
FIG. 5 illustrates a high level flowchart of an embodiment of the invention.

FIG. 5 illustrates a high level flowchart of an embodiment of the invention. The flowchart represents how a single instruction that requires runtime execution information may be compiled to efficiently perform runtime checks. The flowchart is shown to illustrate an embodiment of the invention and, as such, one of skill in the art would readily recognize that no specific order of the steps should be implied from the flowchart. Additionally, steps may be added, taken away, and combined without departing from the scope of the invention.

Typically, a system that is compiling instructions loops through a process of retrieving and compiling instructions. The flowchart of FIG. 5 shows the process for a single instruction. At a step 301, the system receives an instruction for runtime compilation that requires information at runtime. As an example, the instruction may access a field of a class that has not been loaded. Although the class may be loaded to aid compilation, this may slow down performance since at runtime execution it may not be necessary.

The system compiles the instruction into one or more native instructions at a step 303. Since there is runtime execution information that is needed, placeholder data may be placed in the native instructions. The placeholder data may be random data or data selected to indicate some information during runtime execution. In some embodiments, the placeholder data are dummy values.

At a step 305, the system copies the native instructions from a first location to a second location. The first location is typically the location where the native instructions will be executed and the second location may be a buffer where the instructions will be manipulated at runtime. The system overwrites the native instructions at the first location to transfer control to a section of code. The mechanism for transferring control may be one of the native instructions that performs this function including a jump, goto, or call. Typically, the native instruction that transfers control is a short instruction that will not overwrite all of the native instructions. Accordingly, in some embodiments only the portion of the native machine instructions that is overwritten is copied to the second location.

The system places code in the section of code that will replace the placeholder data in the native instructions at the second location with the required runtime execution information at runtime execution at a step 309. For example, if the required runtime information is an offset to an instance variable, the code in the section may determine the offset to the instance variable at runtime execution. Then the offset to the instance variable may be patched into the native instructions where applicable to complete the native instructions.

At a step 311, the system places code in the section of code that will copy the native instructions at the second location to the first location at runtime execution. Thus, the completed native instructions may be copied back to their original location in the compiled code. Copying the native instructions back will also overwrite the native instruction that transfers control that was generated at step 307. In some embodiments, the native machine instructions at the second location are copied back to the first location at runtime execution so that the required runtime execution information may be inserted.

The system places code in the section of code that will transfer control to the native instructions at the first location at runtime execution at a step 313. In short, the embodiment, patches incomplete native instructions the first time the native instructions are executed, but subsequent executions of the native instructions will execute in their correct compiled form. This allows embodiments of the invention to achieve fast performance for runtime class loading and/or initialization checks.

Figure 6A:
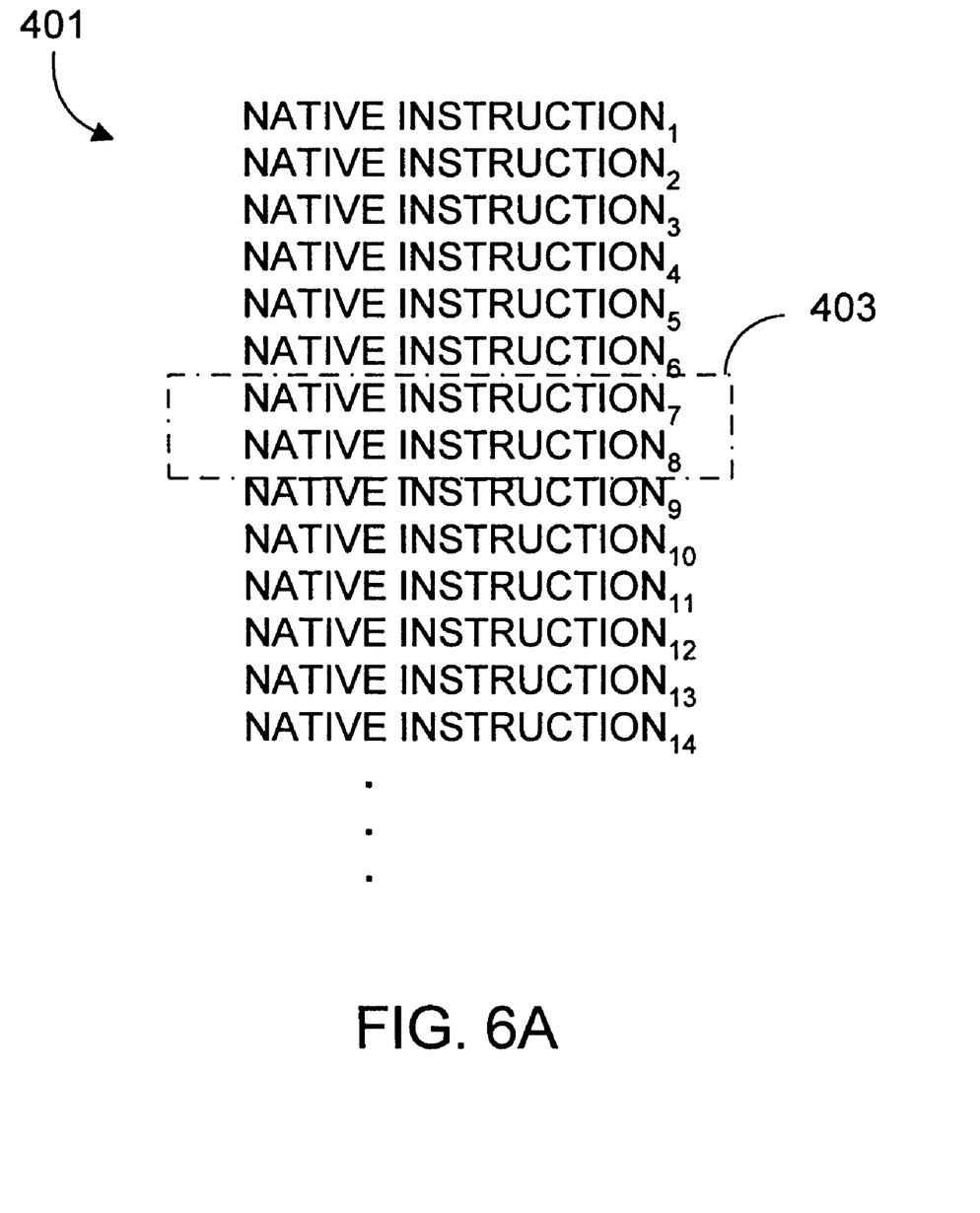
FIG. 6A shows a sequence of native instructions for a compiled method.

Although FIG. 5 described a flowchart of one embodiment, it may be beneficial to analyze how the native instructions may appear in that embodiment. FIG. 6A shows a sequence of native instructions 401. For identification purposes, each machine instruction is given a sequentially labeled subscript. Native instructions (with subscripts 7 and 8) 403 were generated by compiling an instruction. Now assume that the instruction that generated native instructions required runtime execution information.

Figure 6B:
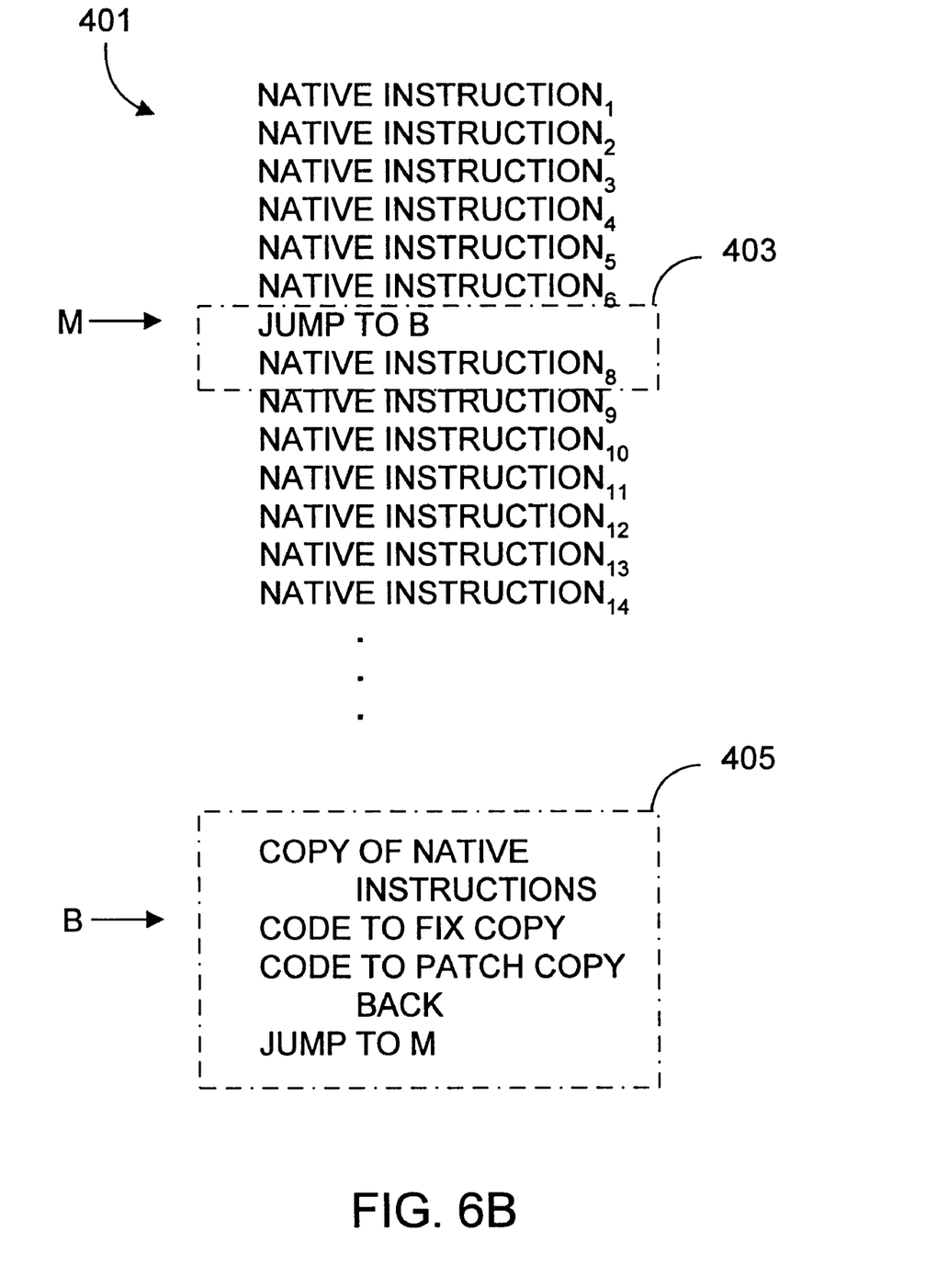
FIG. 6B shows the sequence of native instructions utilizing an embodiment of the invention to perform runtime class loading and initialization checks.

FIG. 6B shows the sequence of native instruction of FIG. 6A including runtime class loading and initialization checks. The reference numerals that are the same in FIGS. 6A and 6B denote similar structures. Native instructions 403 include a jump that transfers control to a section of native instructions 405. The section includes a copy of the original native instructions 403, code to fix the copy of native instructions, code to patch the copy back to its original location, and a jump that transfers control back to native instructions 403. The section of native instructions may be generated by steps 309, 311 and 313 of FIG. 5.

Section of native instructions 405 may be generated after the method is compiled. The labels of M and B are provided to show where control may be transferred. Thus, the section of native instructions will only be executed the first time that native instructions 403 are executed in order to complete the native instructions with the required runtime execution information.

Figure 7A:
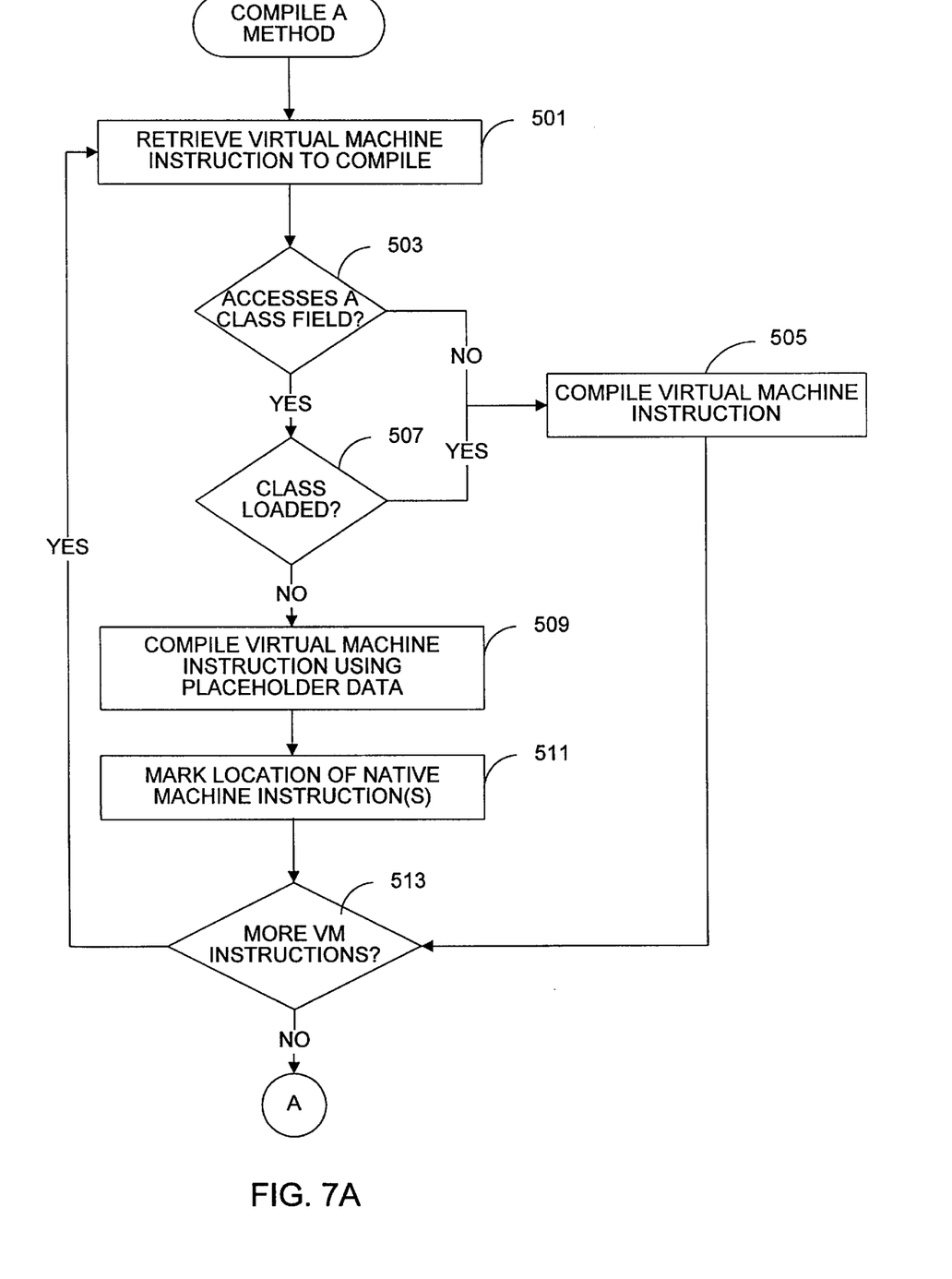
FIGS. 7A and 7B show a flowchart of compiling a method according to an embodiment of the invention.
Figure 7B:
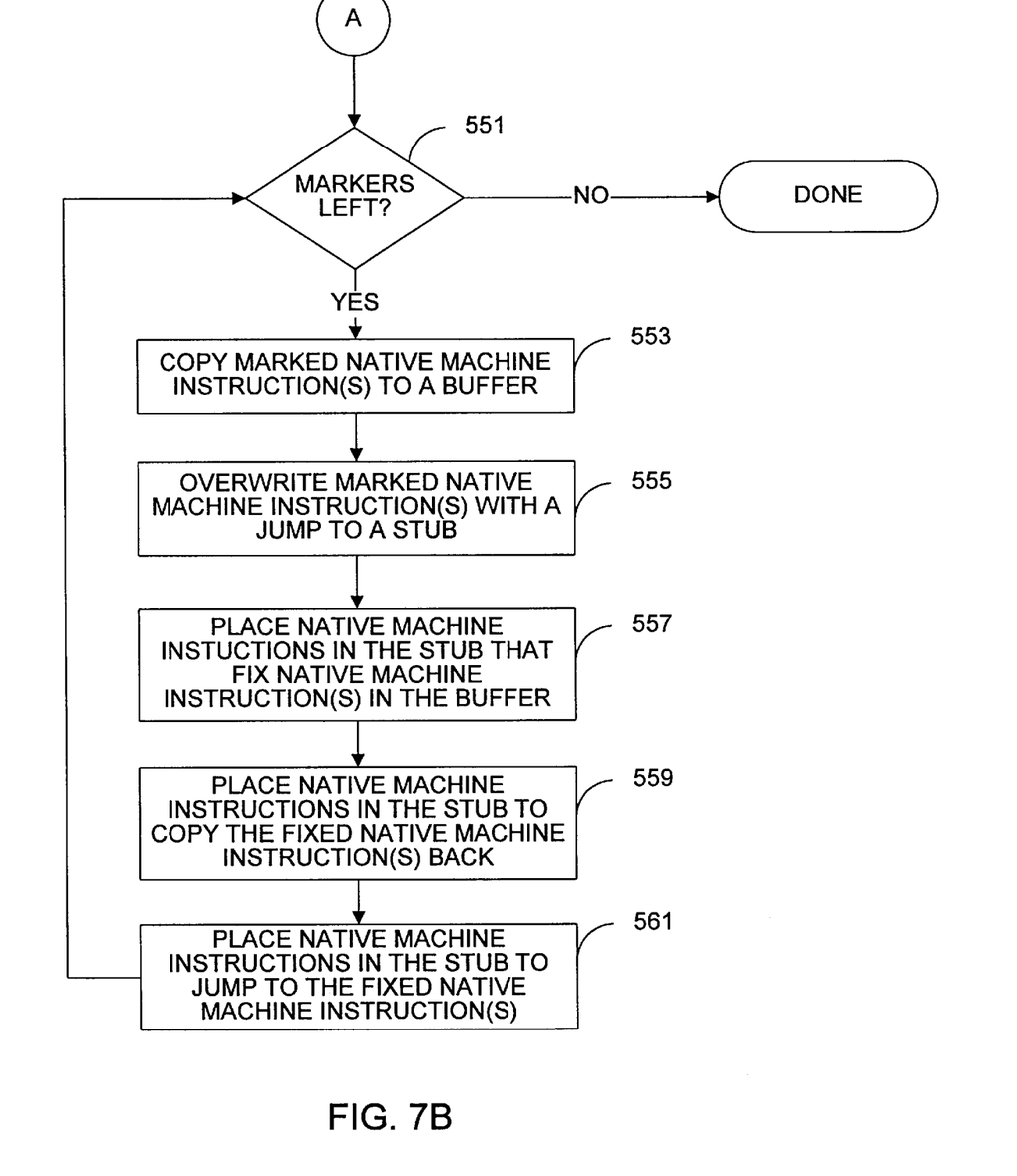

FIGS. 7A and 7B show a flowchart of compiling a method in a Java virtual machine. At a step 501, the system retrieves a virtual machine instruction to compile. Once the virtual machine instruction is retrieved, the system determines if the virtual machine instruction accesses a field at a step 503. Accessing is one way that a virtual machine instruction may require runtime execution information. However, the invention may be advantageously applied to other types of runtime execution information.

If the virtual machine instruction does not access a class field, the virtual machine instruction is compiled at a step 505. Otherwise, the system determines if the class of the field is loaded at a step 507. If the class is loaded, the system will be able to calculate any necessary offsets and proceed at step 505. Additionally, the system may check if the class is loaded but not initialized for static variables. If the class is not initialized, a runtime execution check may be performed to determine if the class has been initialized. Such a check may not be necessary for instance variables since the class will be initialized in order to create an instance of the class.

If the class is not loaded, the system compiles the virtual machine instruction utilizing placeholder data in the place of the require runtime execution information at a step 509. The system may also mark the location of the native machine instructions generated at a step 511 so that after the method if compiled, the code for completing the native machine instructions may be generated (e.g., section of code 405 of FIG. 6B). The marker may record the location designated by M in FIG. 6B.

At a step 513, the system determines if there are more virtual machine instructions to compile. If there are, the system performs step 501. If there are no more virtual machine instructions to compile, the method is compiled, except for the incomplete native machine instructions marked at step 511.

Referring now to FIG. 7B, the system deals with each of the markers by first checking if there are any markers left at a step 551. If there is a marker left (there may be more than one for a compiled method), the system copies the marked native machine instructions to a buffer at a step 553. The buffer may be at a location at the end of the native machine instructions generated when the method was compiled.

At a step 555, the system overwrites the marked native machine instructions with a jump to a stub, which will be used herein to describe a section of code. The system places native machine instructions in the stub that fix or complete the native machine instructions in the buffer at a step 557. At a step 559, the system places native machine instructions in the sub to copy the fixed native machine instructions back to their original location (i.e., the location indicated by the marker).

The system places native machine instructions in the stub to jump to the fixed native machine instructions at a step 561. It may only take a single native machine instruction to transfer control back as in the case of a jump instruction. Therefore, the designation of plural or singular for the terms used in the description may vary depending on the specific embodiment.

Figure 8:
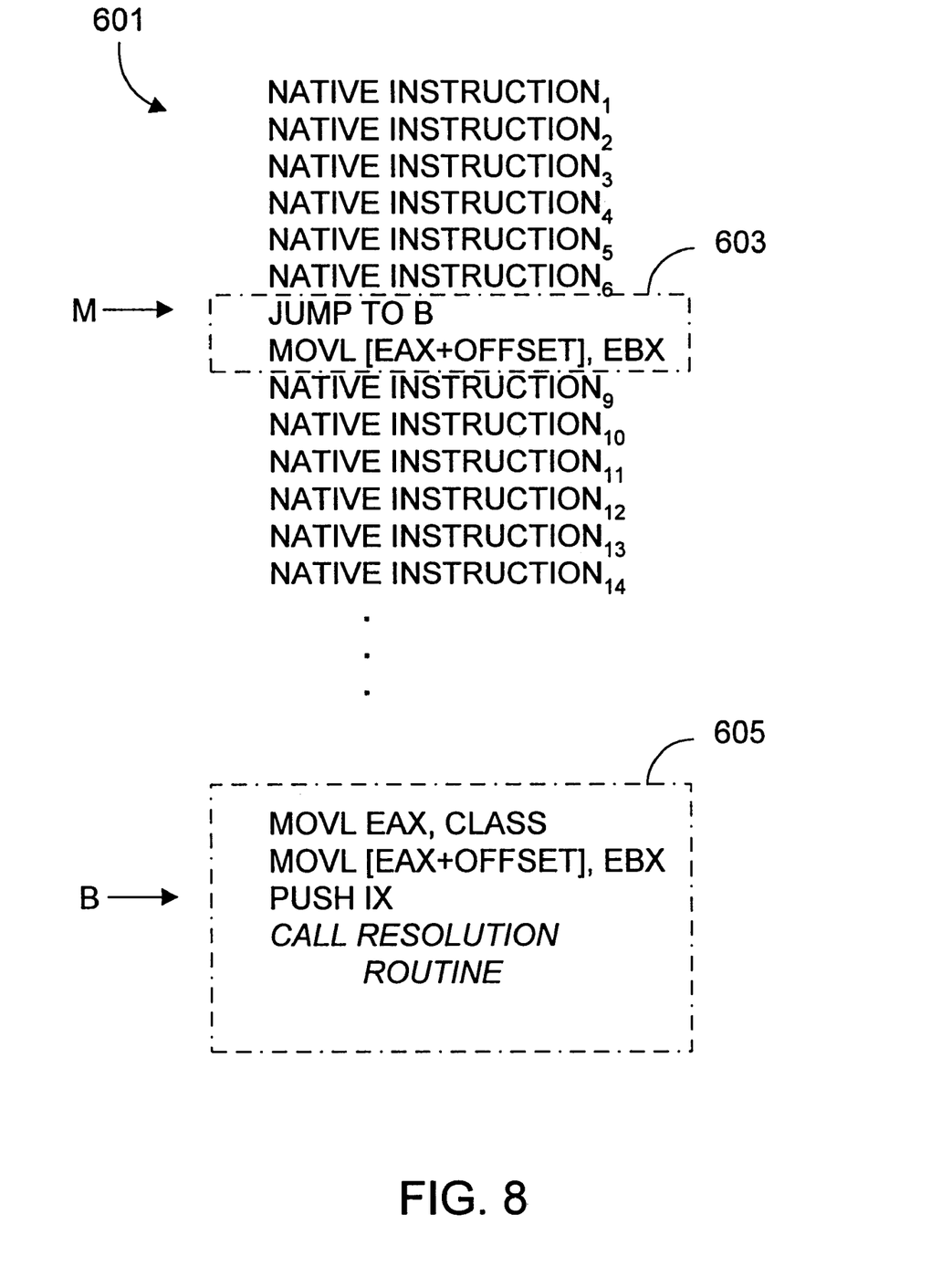
FIG. 8 shows a sequence of native machine instructions for a compiled method in another embodiment of the invention that utilizes a resolution routine.

FIG. 8 shows a sequence of native machine instructions for a compiled method that may be generated by the flowchart shown in FIGS. 7A and 7B. A sequence of native machine instructions 601 is shown that represent the native machine instructions for the method. The Java virtual machine instruction that is represented by native machine instructions 603 is putstatic. The putstatic virtual machine instruction writes a value into a static variable of a class.

The native machine instructions for an IBM compatible machine may be as follows:

MOVL EAX, CLASS
MOVL [EAX+OFFSET], EBX where CLASS represents the location of the class definition in memory and OFFSET represents the offset within the class definition of the static variable. The first move statement moves the location of the class definition in memory to a register EAX. The second move statement moves the contents of a register EBX (contains the value to be stored in the static variable) into a location that is derived by adding register EAX and OFFSET, which is the location of the static variable in memory.

If the class is not loaded, the values for both CLASS and OFFSET may be unresolved until runtime execution. Accordingly, dummy values may be put in their place during runtime compilation.

A section of native machine instructions 605 is shown with a copy of native machine instructions 603 (as shown above). In some embodiments, the section of native machine instructions is a buffer that stores the native machine instructions for manipulations and a stub that includes the native machine instructions to manipulate the buffer. In other embodiments, the buffer acts as a temporary storage for any portion of the native machine instructions that are overwritten and the native machine instructions are manipulated in their original location.

Section of native machine instructions 605 includes a push statement that pushes the index into the constant pool for the field onto the runtime stack. The constant pool will typically include the class, field name, and type signature. Next, a resolution routine may be called from the section of native machine instructions.

Figure 9:
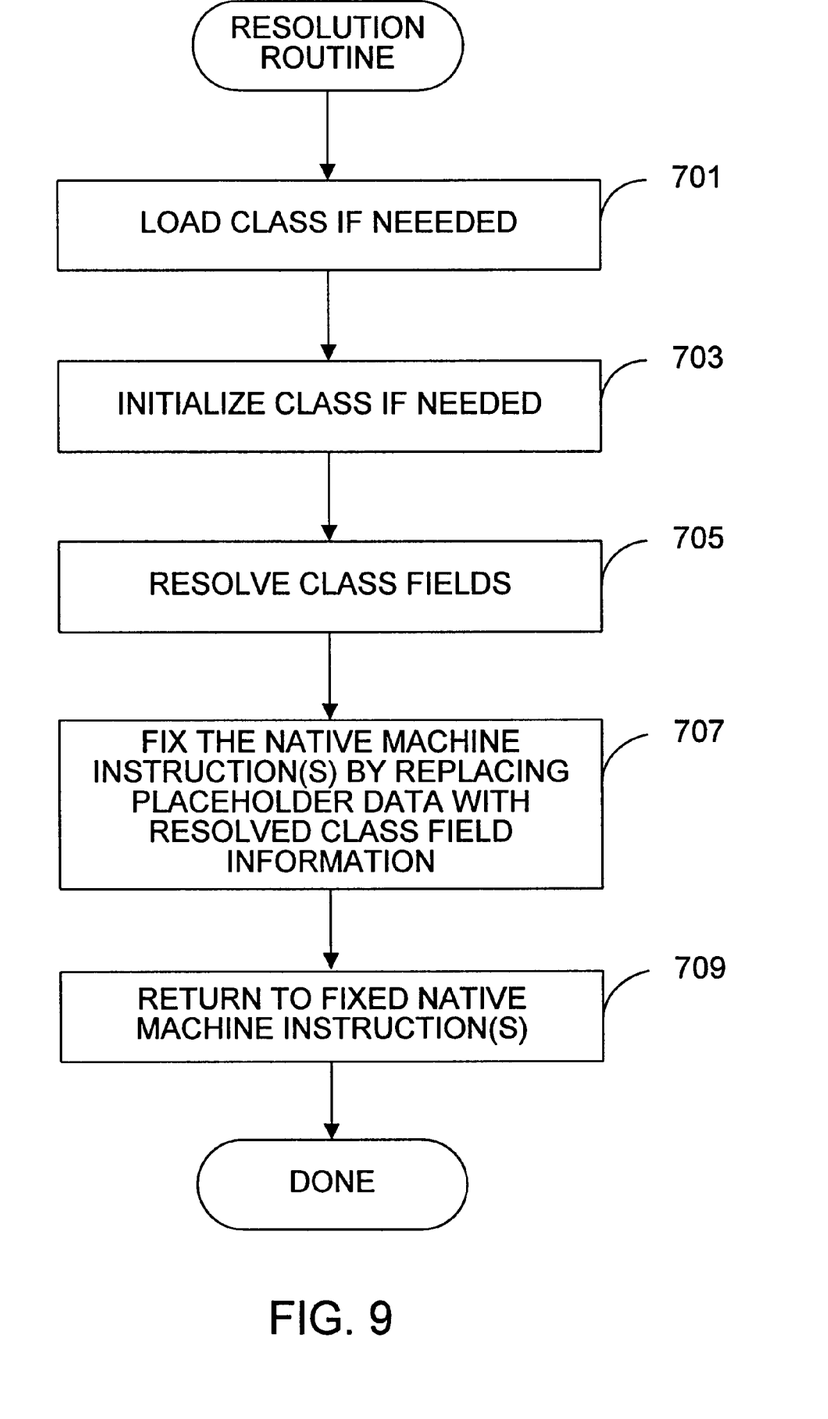
FIG. 9 shows a flowchart of a resolution routine that may be called from the native machine instructions of FIG. 8.

The resolution routine may complete the native machine instructions and an embodiment of the routine is shown in FIG. 9. At a step 701, the routine loads the class if needed. The class is specified by the index into the constant pool that was pushed on the stack prior to calling the resolution routine. The routine initializes the class if needed at a step 703. The class may not need to be loaded or initialized because these steps may have already been done during runtime execution in a different part of the Java program. Additionally, the resolution routine is shown as checking both class loading and initialization. Although both steps are performed in a preferred embodiment, other and different runtime execution checks may be performed with the invention.

At a step 705, the routine resolves the class fields. The routine may resolve only the location of a field in memory or both the location of the field and the class to which it belongs. The routine fixes the native machine instructions by replacing the placeholder data with the resolved class field information at a step 707. At a step 709, the routine returns to the fixed native machine instructions to continue execution.

As indicated by FIGS. 8 and 9, the section of native machine instructions may call upon other routines to complete the native machine instructions so it is not necessary that the section include all the code in all embodiments. In a preferred embodiment, the resolution routine is called by each of the section of native machine instructions generated by the invention.

Conclusion

While the above is a complete description of preferred embodiments of the invention, various alternatives, modifications, and equivalents may be used. It should be evident that the invention is equally applicable by making appropriate modifications to the embodiments described above. For example, although the embodiments described have been in reference to specific runtime execution information, the principles of the present invention may be readily applied to any runtime information that is unavailable during runtime compilation. Therefore, the above description should not be taken as limiting the scope of the invention that is defined by the metes and bounds of the appended claims along with their full scope of equivalents.

What is claimed is:

1. In a computer system, a method for compiling instructions, the method comprising:
   receiving an instruction for runtime compilation that requires runtime execution information;
   compiling the instruction into at least one native machine instruction at a first location, the at least one native machine instruction including placeholder data for the required runtime execution information; and
   overwriting the at least one native machine instruction at the first location with a native machine instruction that transfers control to a section of native machine instructions that, at runtime, will replace the placeholder data with the required runtime execution information.

2. The method of claim 1, further comprising copying the at least one native machine instruction to a second location.

3. The method of claim 2, wherein the section of native machine instructions replaces the placeholder data in the at least one native machine instruction at the second location with the required runtime execution information.

4. The method of claim 3, wherein the section of native machine instructions copies the at least one native machine instruction with the required runtime execution information at the second location to the first location.

5. The method of claim 4, wherein the section of native machine instructions transfers control to the at least one native machine instruction with the required runtime execution information at the first location.

6. The method of claim 2, wherein the section of native machine instructions, at runtime execution, copies the at least one native machine instruction to the first location.

7. The method of claim 6, wherein the section of native machine instructions, at runtime execution, replaces the placeholder data in the at least one native machine instruction at the first location with the required runtime execution information.

8. The method of claim 7, wherein the section of native machine instructions transfers control to the at least one native machine instruction with the required runtime execution information at the first location.

9. The method of claim 1, wherein the required runtime execution information is unavailable during runtime compilation because a class has not been loaded.

10. The method of claim 9, wherein the required runtime execution information relates to an instance variable of the class that has not been loaded.

11. The method of claim 9, wherein the required runtime execution information relates to a static variable of the class that has not been loaded.

12. The method of claim 1, wherein the required runtime execution information is whether a class is initialized at runtime execution for a static variable.

13. The method of claim 12, wherein a runtime execution check is performed to determine if the class has been initialized.

14. The method of claim 1, wherein the instruction is a virtual machine instruction.

15. The method of claim 14, wherein the instruction is a Java virtual machine instruction.

16. The method of claim 15, wherein the instruction is getfield, putfield, getstatic, or putstatic.

17. A computer program product for providing extensible applications, comprising:
- computer code that receives an instruction for runtime compilation that requires runtime execution information;
- computer code that compiles the instruction into at least one native machine instruction at a first location, the at least one native machine instruction including placeholder data for the required runtime execution information; and
- computer code that overwrites the at least one native machine instruction at the first location with a native machine instruction that transfers control to a section of native machine instructions that, at runtime, will replace the placeholder data with the required runtime execution information; and
- a computer readable medium that stores the computer codes.

18. The computer program product of claim 17, wherein the computer readable medium is selected from the group consisting of CD-ROM, floppy disk, tape, flash memory, system memory, hard drive, and data signal embodied in a carrier wave.

19. In a computer system, a method for compiling instructions, the method comprising:
- receiving an instruction for runtime compilation that requires runtime execution information;
- compiling the instruction into at least one native machine instruction at a first location, the at least one native machine instruction including placeholder data for the required runtime execution information;
- copying the at least one native machine instruction to a second location;
- generating a section of native machine instructions that, at runtime, replaces the placeholder data in the at least one native machine instruction at the second location with the required runtime execution information, copies the at least one native machine instruction with the required runtime execution information at the second location to the first location, and transfers control to the at least one native machine instruction with the required runtime execution information at the first location; and
- overwriting the at least one native machine instruction at the first location with a native machine instruction that transfers control to the section of native machine instructions.

20. The method of claim 19, wherein the required runtime execution information is unavailable during runtime compilation because a class has not been loaded.

21. The method of claim 20, wherein the required runtime execution information relates to an instance variable of the class that has not been loaded.

22. The method of claim 20, wherein the required runtime execution information relates to a static variable of the class that has not been loaded.

23. The method of claim 19, wherein the required runtime execution information is whether a class is initialized at runtime execution for a static variable.

24. The method of claim 23, wherein a runtime execution check is performed to determine if the class has been initialized.

25. A computer program product for providing extensible applications, comprising:
- computer code that receiving an instruction for runtime compilation that requires runtime execution information;
- computer code that compiles the instruction into at least one native machine instruction at a first location, the at least one native machine instruction including placeholder data for the required runtime execution information;
- computer code that copies the at least one native machine instruction to a second location;
- computer code that generates a section of native machine instructions that, at runtime, replaces the placeholder data in the at least one native machine instruction at the second location with the required runtime execution information, copies the at least one native machine instruction with the required runtime execution information at the second location to the first location, and transfers control to the at least one native machine instruction with the required runtime execution information at the first location; and
- computer code that overwrites the at least one native machine instruction at the first location with a native machine instruction that transfers control to the section of native machine instructions; and
- a computer readable medium that stores the computer codes.

26. The computer program product of claim 25, wherein the computer readable medium is selected from the group consisting of CD-ROM, floppy disk, tape, flash memory, system memory, hard drive, and data signal embodied in a carrier wave.

27. In a computer system, a method for compiling instructions, the method comprising:
- receiving an instruction for runtime compilation that requires runtime execution information;
- compiling the instruction into at least one native machine instruction at a first location, the at least one native machine instruction including placeholder data for the required runtime execution information;
- copying the at least one native machine instruction to a second location;
- generating a section of native machine instructions that, at runtime, copies the at least one native machine instruction at the second location to the first location, replaces the placeholder data in the at least one native machine instruction at the first location with the required runtime execution information, and transfers control to the at least one native machine instruction with the required runtime execution information at the first location; and
- overwriting the at least one native machine instruction at the first location with a native machine instruction that transfers control to the section of native machine instructions.

28. The method of claim 27, wherein the required runtime execution information is unavailable during runtime compilation because a class has not been loaded.

29. The method of claim 28, wherein the required runtime execution information relates to an instance variable of the class that has not been loaded.

30. The method of claim 28, wherein the required runtime execution information relates to a static variable of the class that has not been loaded.

31. The method of claim 27, wherein the required runtime execution information is whether a class is initialized at runtime execution for a static variable.

32. The method of claim 31, wherein a runtime execution check is performed to determine if the class has been initialized.

33. A computer program product for providing extensible applications, comprising:

computer code that receiving an instruction for runtime compilation that requires runtime execution information;

computer code that compiles the instruction into at least one native machine instruction at a first location, the at least one native machine instruction including placeholder data for the required runtime execution information;

computer code that copies the at least one native machine instruction to a second location;

computer code that generates a section of native machine instructions that, at runtime, copies the at least one native machine instruction at the second location to the first location, replaces the placeholder data in the at least one native machine instruction at the first location with the required runtime execution information, and transfers control to the at least one native machine instruction with the required runtime execution information at the first location; and computer code that overwrites the at least one native machine instruction at the first location with a native machine instruction that transfers control to the section of native machine instructions; and a computer readable medium that stores the computer codes.

34. The computer program product of claim 33, wherein the computer readable medium is selected from the group consisting of CD-ROM, floppy disk, tape, flash memory, system memory, hard drive, and data signal embodied in a carrier wave.

35. In a computer system, a method for compiling non-native instructions for a native machine, the method comprising:

receiving a non-native instruction that is to be executed on the native machine, the non-native instruction requiring runtime execution information so that the non-native instruction can be executed on the native machine;

compiling the non-native instruction into a first set of native machine instructions; the first set of native machine instructions including at least one native machine instruction;

generating a second set of native machine instructions that when executed on the native machine can provide the runtime execution information to allow the first set of native instructions to be executed on the native machine, the second set of native machine instructions including at least one native machine instruction;

causing execution of instructions on the native machine to be transferred from the first set of native machine instructions to the second set of native machine instructions when the first set of native machine instructions are to be executed on the native machine.

36. The method as recited in claim 35, wherein causing the execution of the instructions on the native machine to be transferred from the first set of native machine instructions to the second set of native machine instructions comprises:

generating a transfer control instruction that can be executed on the native machine to transfer control of execution of instructions on the native machine;

overwriting at least one instruction in the first set of native machine instructions with the transfer control instruction, the transfer control instruction transferring control of execution on the native machine from the first set of native machine instructions to the second set of native machine instruction.

37. The method as recited in claim 35, wherein at least one instruction of the first set of native machine instructions is overwritten by at least one instruction from the second set of native machine instructions.

38. The method of claim 35, wherein the non-native instruction is a virtual machine instruction.

39. The method of claim 35, wherein the non-native instruction is a Java virtual machine instruction.

* * * * *